United States Patent [19]

Nagata et al.

[11] Patent Number: 4,979,210
[45] Date of Patent: Dec. 18, 1990

[54] METHOD AND APPARATUS FOR PROTECTION OF SIGNAL COPY

[75] Inventors: Atsushi Nagata, Hirakata; Yutaka Uekawa, Ashiya; Takanori Senoo, Hirakata; Kenichi Takahashi, Kyoto, all of Japan

[73] Assignee: Matsushita Electric Industrial Co., Ltd., Osaka, Japan

[21] Appl. No.: 216,495

[22] Filed: Jul. 8, 1988

[30] Foreign Application Priority Data

| Jul. 8, 1987 | [JP] | Japan | 62-170248 |
| Jul. 8, 1987 | [JP] | Japan | 62-170249 |
| Sep. 21, 1987 | [JP] | Japan | 62-236527 |
| Dec. 15, 1987 | [JP] | Japan | 62-316635 |

[51] Int. Cl.$^5$ ............................. G11B 15/05
[52] U.S. Cl. ............................. 380/3; 380/4; 380/23; 360/60
[58] Field of Search ............................. 380/3-5, 380/6, 23; 360/60; 370/69.1; 340/825.31, 825.34

[56] References Cited

U.S. PATENT DOCUMENTS

| 2,880,275 | 3/1959 | Kahn | 370/69.1 |
| 4,086,634 | 4/1978 | Cook | 360/60 |
| 4,185,305 | 1/1980 | Perret et al. | 380/5 |
| 4,305,101 | 12/1981 | Yarbrough et al. | 360/60 |
| 4,475,129 | 10/1984 | Kagota | 380/5 |
| 4,573,205 | 2/1986 | Nash | 380/6 |
| 4,598,288 | 7/1986 | Yarbrough et al. | 360/60 X |
| 4,632,355 | 12/1986 | Dickson et al. | 242/200 |
| 4,775,901 | 10/1988 | Nakano | 360/60 |
| 4,802,212 | 1/1989 | Freeman et al. | 380/3 |

FOREIGN PATENT DOCUMENTS

| 0107286 | 5/1984 | European Pat. Off. . |
| 0140705 | 5/1985 | European Pat. Off. . |
| 2530101 | 1/1984 | France | 380/6 |
| 60-1660 | 1/1985 | Japan . |
| 61-123026 | 6/1986 | Japan . |
| 1166085 | 10/1969 | United Kingdom . |
| 1567333 | 5/1980 | United Kingdom . |

OTHER PUBLICATIONS

"DAT Conference Bulletin"; 7/19/85; 360/60.
M. Hamilton, "Record Industry Unveils Device to Block Copying"; The Washington Post, 3/26/86, p. G3, 360/60.
Extended Abstracts/Spring Meeting, 88-1, May 15-20, 1988, pp. 202-203, abstract No. 135, Princeton, N.Y., H. H. Chen et al., "Gated Isolation Structure for High Density, High Speed Radiation-Hardened Bulk CMOS Technology".
CBS Technology Center, "Technical Description of the CBS Copy-Coded System".
JAS Journal, 5/87, pp. 3-7; (in Japanese); "Technique for an Illegal Copy Prevention System; CBS Copy Code System and DAT Discussion"; by Masahiro Kosaka and Gyoji Kawamoto.

Primary Examiner—Stephen C. Buczinski
Assistant Examiner—Bernarr Earl Gregory
Attorney, Agent, or Firm—Wenderoth, Lind & Ponack

[57] ABSTRACT

An apparatus for the protection of signal copy for prevention unauthorized copying of music software such as records, compact discs and music tape by recording is arranged such that when recording audio signals on a medium, certain supplemental information is added to the audio signal to be recorded, and in the process of copying by reproducing this medium, when the supplemental signal is detected in the reproduced signal, the copying action is stopped to protect it from being copied.

5 Claims, 13 Drawing Sheets

FIG. 18(a)
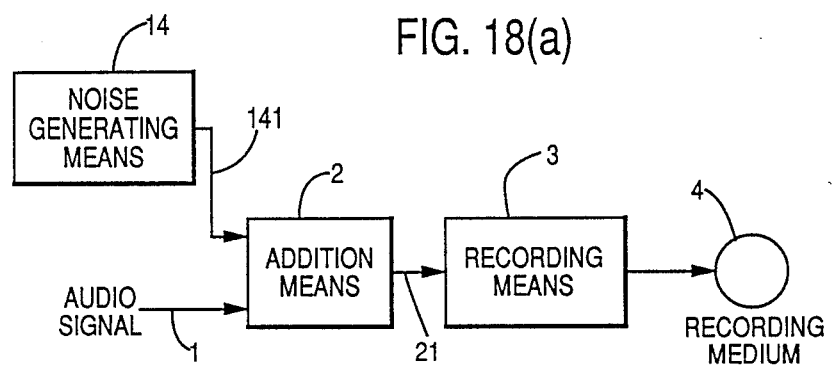
FIG. 18(b)
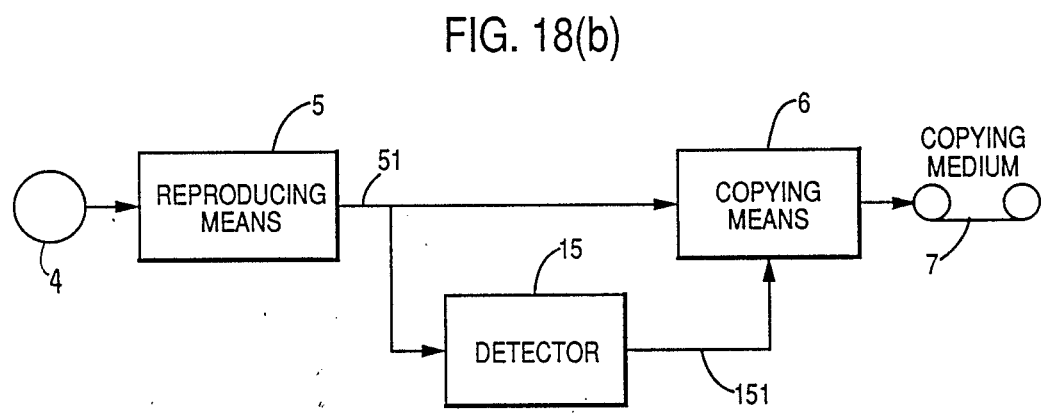
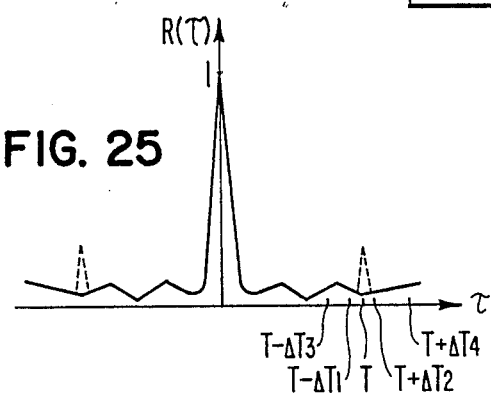
FIG. 25
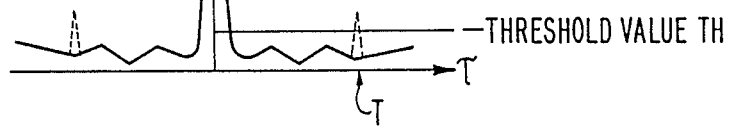
FIG. 28

METHOD AND APPARATUS FOR PROTECTION OF SIGNAL COPY

BACKGROUND OF THE INVENTION

1. Field of the Invention

This invention relates to a method and apparatus for protection of signal copy intended to prevent unauthorized copy of music software such as record, compact disk (CD) and music tape by recording.

2. Description of the Prior Art

Recently, with the advent of DAT (Digital Audio Tape-recorders), it has come to be possible to copy the music software with a high quality. To the contrary, the music software manufactures wish to introduce a system to prevent copying of music software by a recorder.

Formerly, as one of such systems, a copy code system disclosed by CBS was known. This system is described below.

In the manufacturing process of music software, that is, in the step of recording audio signals onto a recording medium such as a record, a CD and music tape, the audio signals recorded in the recording medium have their signal level attenuated level in a specific band by a band elimination filter. The center frequency of this band elimination filter is 3840 Hz, and the band is 250 Hz wide.

In the process of recording by reproducing this recording medium, the reproduction signal is respectively fed into two bandpass filters. The first bandpass filter has a center frequency at 3840 Hz, and the second bandpass filter, has a center frequency near 3840 Hz. Comparing the output amplitudes of these two bandpass filters, when the first bandpass filter is lower than the second bandpass filter, it is judged that the signal level of a specific band has been attenuated at the time of fabrication of the software, and the recording action is stopped. That is, by attenuating the signal in a specific band at the time of fabrication of the music software, copying by recording is prevented.

In such a constitution, however, an inaudible sound is present for attenuating a specific band of audio signals, or the sound quality changes due to large variations of the phase characteristic in the vicinity of the attenuation band of the band elimination filter. Or, in a music source originally small in the signal components of 3840 Hz, there was a possibility of malfunction. Thus, the conventional method has various problems.

SUMMARY OF THE INVENTION

It is hence a primary object of this invention to present an apparatus for the protection of signal copy which produces only small changes in the sound quality due to the attenuation of a signal in a specific band or produces only small changes in the phase characteristic, and has a low possibility of malfunction for any audio signal.

In order to achieve the above object, this invention comprises a supplemental information addition step for adding supplemental information to audio signals in the process of recording audio signals on a recording medium, and a detection step for detecting that said supplemental information is contained in a reproduced signal, and a copy protection step for preventing copy depending on the result of said detection step in the process for reproducing and copying said recording medium.

In this constitution, an audio signal for protecting from copying is recorded in the recording medium together with supplemental information, and when the supplemental information is detected in the reproduced signal in the process of reproducing and copying the recording medium, the copy action is prevented, so that an apparatus for the protection of signal copy which causes only small sound quality changes and few malfunctions may be realized.

BRIEF DESCRIPTION OF THE DRAWINGS

FIGS. 18(a)-(b) are block diagrams of a fourth embodiment in accordance width this invention;

FIG. 24 (b) is a structural drawing of a copy code detector;

FIG. 25 is a graph showing the mode of normalizing auto-correlation function;

FIG. 28 is an explanatory drawing showing the mode of normalizing an auto-correlation function;

DETAILED DESCRIPTION OF THE PREFERRED EMBODIMENTS

Figure 1:
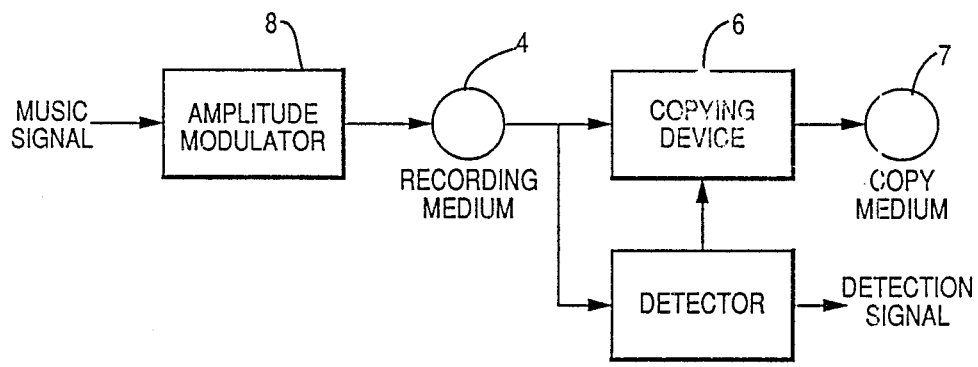
FIG. 1 is a structural drawing of a signal copy protection apparatus in accordance with a first embodiment of this invention.

FIG. 1 shows the structure of a signal copy protection apparatus in accordance with a first embodiment of this invention, in which numeral 8 denotes an amplitude modulator numeral 4 denotes a recording medium, and numeral 9 denotes a detector which controls a copy apparatus.

The operation of thus composed signal copy protection apparatus is described while referring to FIG. 1 to FIG. 11.

Figure 2:
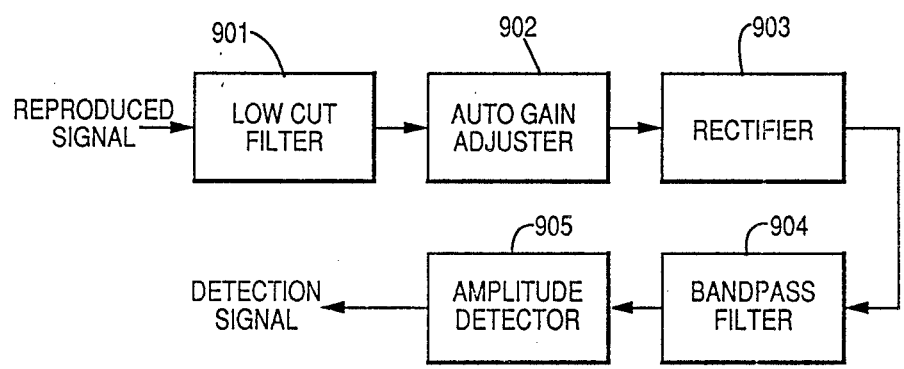
FIG. 2 is a detailed block diagram of the detector shown in FIG. 1.

FIG. 2 is a detailed block diagram of a detector 9 in FIG. 1, and numeral 901 denotes a low cut filter, numeral 902 denotes an automatic gain adjuster numeral 903 denotes a wave detector numeral 904 denotes, a bandpass filter, and numeral 905 denotes an amplitude detector.

Figure 3:
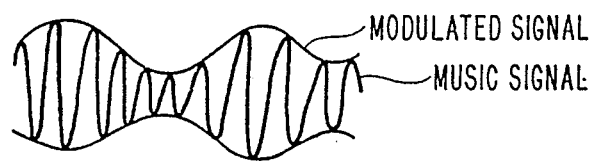
FIG. 3 is an amplitude modulation waveform.
Figure 4:
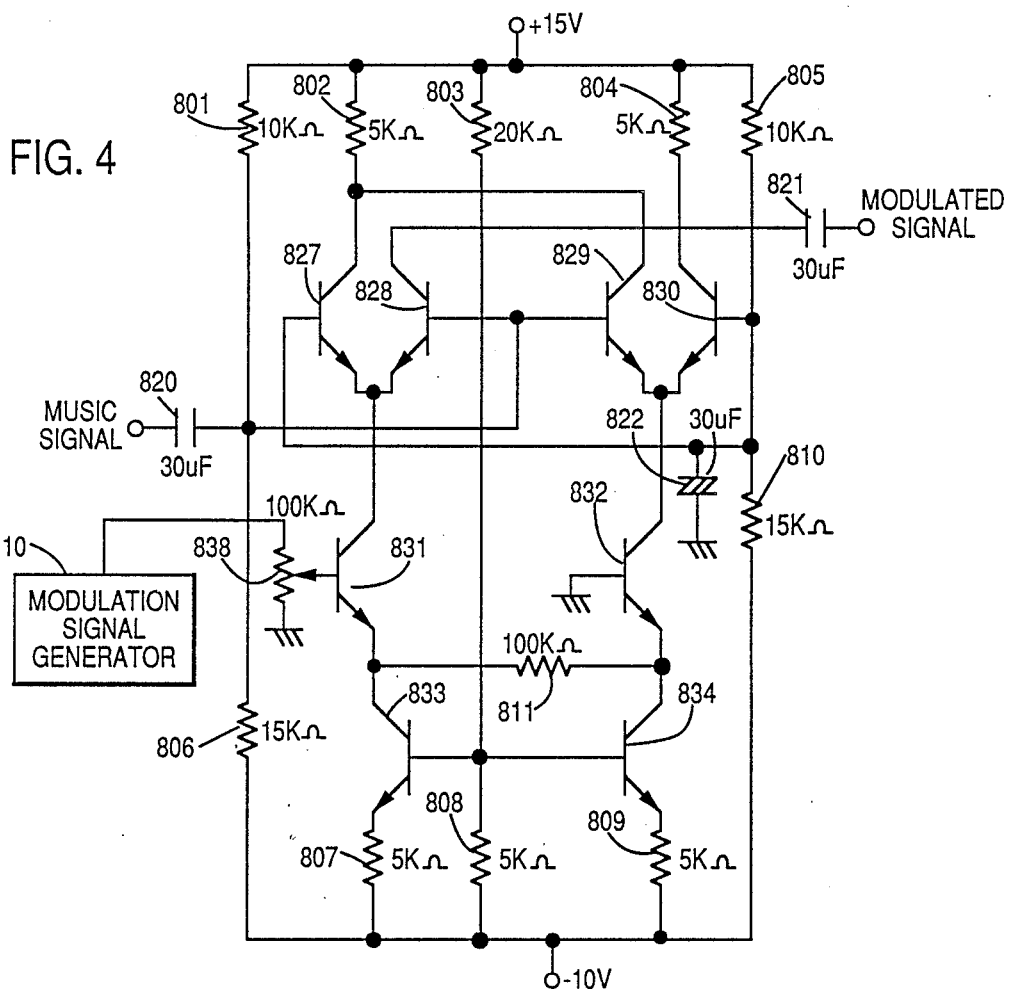
FIG. 4 is a structural drawing of an amplitude modulator.

In the audio signals containing signals used to prohibit copying an, amplitude modulation of a specified value is effected by an amplitude modulator 8 as shown in FIG. 3. A practical circuit composition of the amplitude modulator 8 is shown in FIG. 4. In FIG. 4, numerals 801 to 811 denote resistors 820 to 822 denote capacitors; numerals 827 to 834 denote transistors numeral 838 denotes variable resistor, and numeral 10 denotes a modulation signal generator; the above-noted elements are connected as shown in the drawings to form a multiplier.

The audio (i.e.-music) signal is fed to the capacitor 820, and is combined with the output of the modulation signal generator 10 to effect amplitude modulation, so that it is delivered to the output of the capacitor 821 as a modulation output. The degree of modulation is increased or decreased by adjusting the variable resistor 838.

Figure 5:
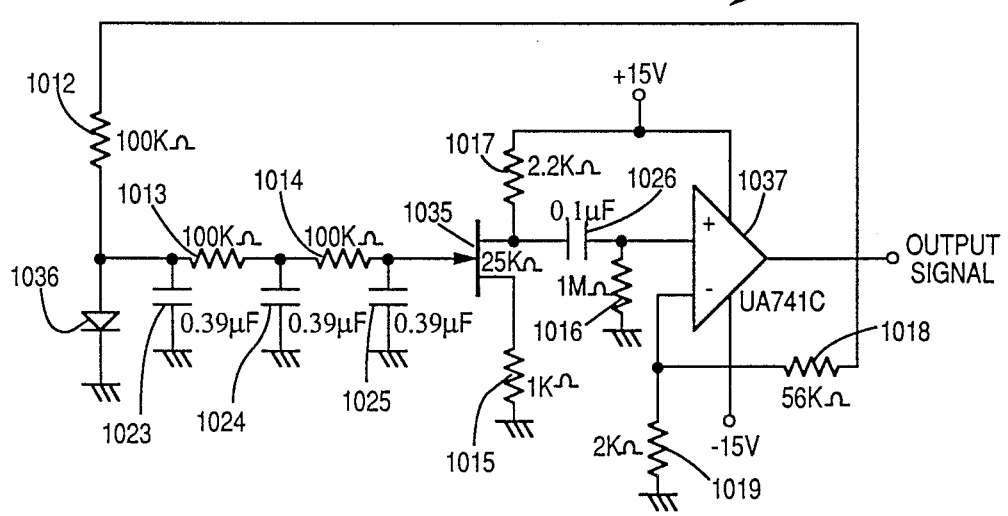
FIG. 5 is a structural drawing of a modulation signal generator.

The details of the modulation signal generator are is shown in FIG. 5, in which numerals 1012 to 1019 denote resistors, numerals 1023 to 1026 denote capacitors; numeral 1035 denotes a field effect transistor; numeral 1036 denotes a diode, and numeral 1037 denotes an operational amplifier; these elements are connected as shown to form an oscillator by the three-step feedback of the resistors and capacitors. The oscillation frequency is about 10 Hz, and it is delivered from the output terminal of the operational amplifier 1037. The modulation frequency is a value outside the audible band for human ears, for example, 10 Hz, and the degree of modulation is similarly below the human detectable level, for example, 2%. When such modulation is effected, a sound quality change is not detected at all. When an attempt is made to duplicate on a copying medium 7 such as tape in the copy apparatus by reproducing audio signals from the recording medium or transmission medium such as a disc, tape and broadcast wave containings such signals, the detector operates as described below.

Figure 6:
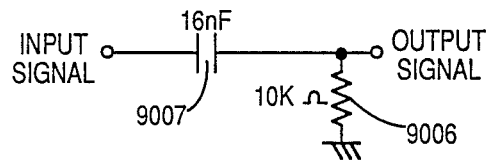
FIG. 6 is a structural drawing of a low cut filter.
Figure 7:
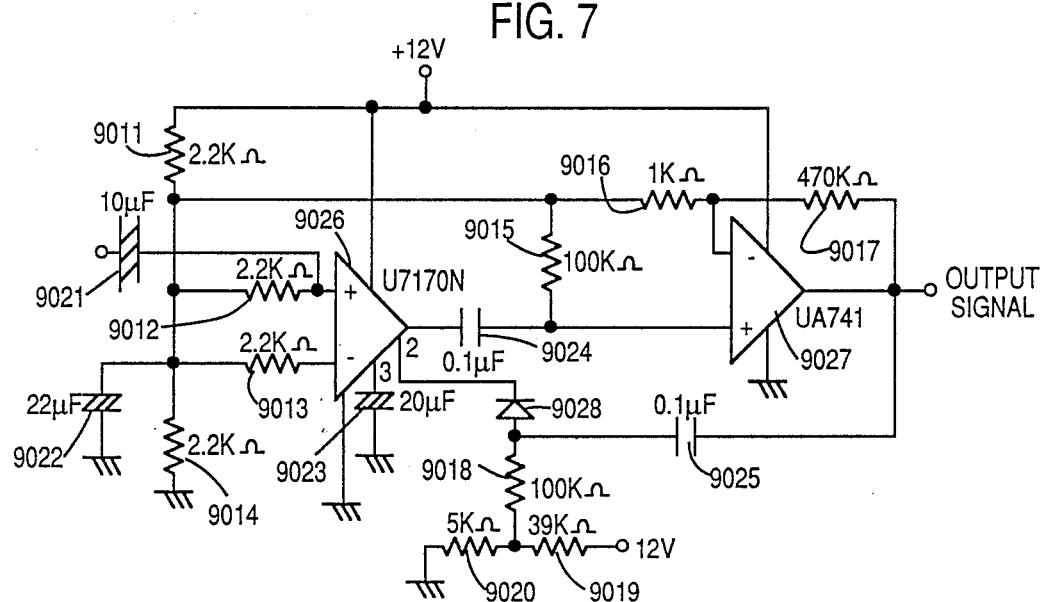
FIG. 7 is a structural drawing of an automatic gain adjuster.
Figure 8:
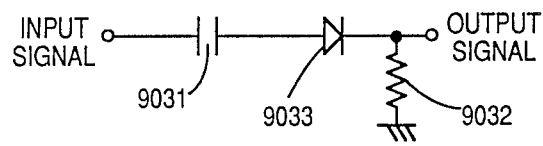
FIG. 8 is a structural drawing of a wave detector.
Figure 9:
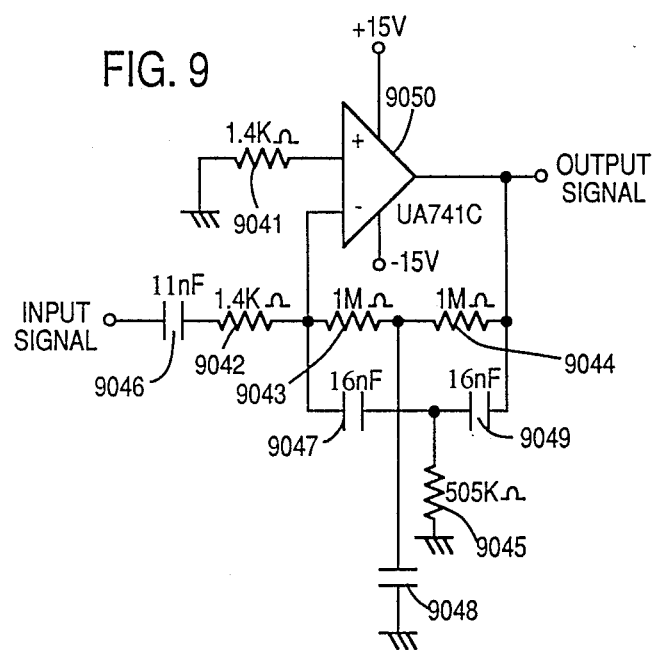
FIG. 9 is a structural drawing of a bandpass filter.
Figure 10:
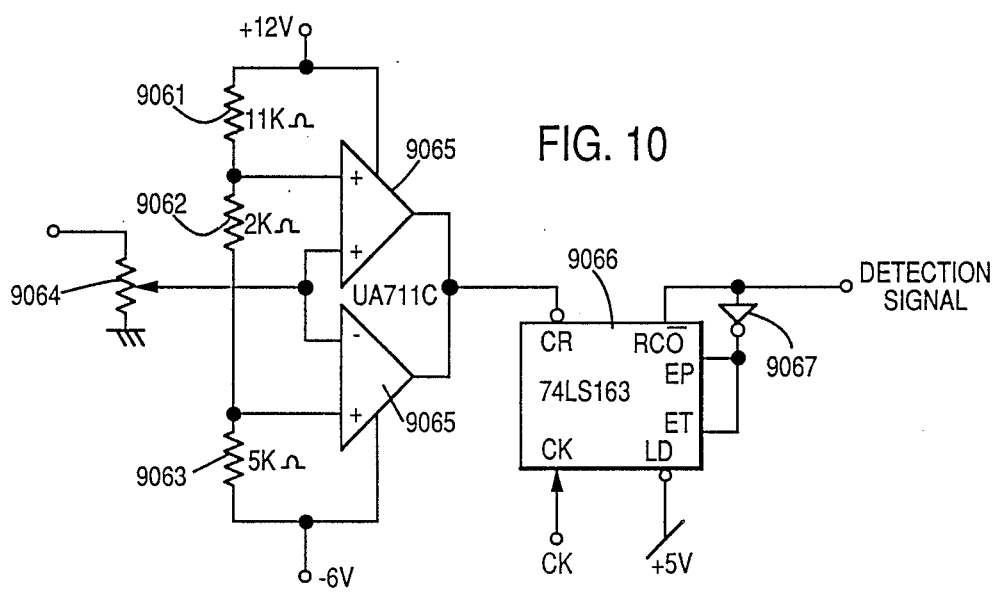
FIG. 10 is a structural drawing of an amplitude detector.

First, the low frequency components originally present in the reproduction signals are removed by the low cut filter 901, and a malfunction of the detector is prevented. FIG. 6 shows the structure of the low cut filter 901, in which numeral 9006 denotes a resistor, and numeral denotes 9007 a capacitor, and a primary low cut filter is composed as shown in the drawing. The cutoff frequency is about 1 kHz. By keeping constant the amplitude of the reproduction signal by the automatic gain adjuster 902, the amplitude of the modulation signal is kept constant to be easily detected. The structure of the automatic gain adjuster 902 is shown in FIG. 7, in which numerals 9011 to 9020 denote resistors; numerals 9021 to 9025 denote capacitors numeral 9027 denotes an operational amplifier numeral 9028 denotes a diode, and numeral 9026 denotes an automatic gain adjusting amplifier. The response frequency is 1 Hz, which is lower than the frequency of modulation signal. The low-cut signal is fed to the capacitor 9021, and is set at a constant gain, and is then delivered from the output of the operational amplifier 9027. The response speed of the automatic gain adjuster is, needless to say, set sufficiently slower than the period of the modulation frequency. Next, detecting this signal by the wave detector 903, the amplitude change components are taken out. The composition of a wave detector is shown in FIG. 8, in which numeral 9031 denotes capacitor numeral, 9032 denotes a resistor, and numeral 9033 denotes a diode. In these amplitude change components, since there is a possibility of the presence of echo or tremolo components originally contained in the audio signals, aside from the modulation signals, only the modulation signal components are taken out by the bandpass filter 904. The structure of the bandpass filter 902 is shown in FIG. 9, in which numerals 9041 to 9045 denote resistors; numerals 9046 to 9049 denote capacitors, and numeral 9050 denotes an operational amplifier; these elements are combined to form a twin T bandpass filter. Of the signals fed to capacitor 9046, only the 10 Hz components are delivered from the output terminal of the operational amplifier 9050. Finally, checking the amplitude of this modulation signal by the amplitude detector 905, if the degree of modulation is of specified value for a specified duration, it is judged as copy prohibition, and the detection signal is delivered, or the operation of the copy apparatus is stopped. The structure of the amplitude detector 905 is shown in FIG. 10, in which numerals 9061 to 9063 denote resistors; numeral 9064 denotes a variable resistor numeral 9065 denotes a level comparator numeral 9066 denotes a counter, and numeral 9067 denotes is an inverter, and when the amplitude of the signal fed into the input terminal of the variable resistor 9064 is outside the voltage range determined by resistances 9061 to 9063, the counter 9066 starts counting the clock CK fed into the clock terminal, and after the passage of a specified time, the detection signal of a high level is delivered from the output terminal RCO.

Figure 11:
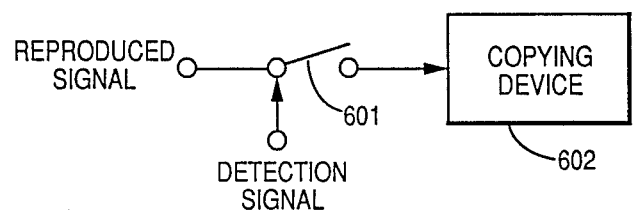
FIG. 11 is a structural drawing of a copying machine.

The structure of the copy apparatus 6 is shown in FIG. 11, in which numeral 601 denotes a switch and numeral 602 denotes a copying machine. When the detection signal which is an output of the amplitude detector 905 is at a high level, the music signal is prevented from being fed into the copying machine.

Thus, according to the first embodiment, which comprises an amplitude modulator for amplitude-modulating the input signal, a recording medium for transmitting output signal of said amplitude modulator, a detector for detecting an amplitude modulation signal by detecting the output signal of said recording medium, and a copy apparatus for copying the output signal of said recording medium into a copying medium, said detector detects that the output signal of said recording medium is amplitude-modulated to a desired value, and delivers the detection signal or stops the operation of said copy apparatus, thereby specifying prohibition of copying depending on the presence or absence of amplitude modulation. Therefore, degradation of the original audio signal does not occur, and the change in amplitude is kept under the human detectable limit by sufficiently reducing the degree of amplitude modulation, and erroneous detection can be prevented by properly selecting the frequency of modulation signal and degree of modulation.

In the first embodiment, meanwhile, a single-frequency signal was used as the modulation signal, but the same effects will be obtained by using arbitrary signals. In such a case, as the modulation signal detecting means, instead of the bandpass filter, for example, a correlator may be used for extracting the features of the modulation signal.

A second embodiment of this invention is described below while referring to the accompanying drawings.

Figure 12:
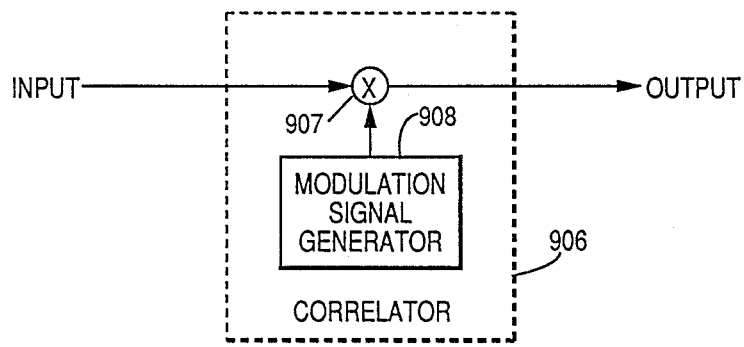
FIG. 12 is a block diagram of a correlator used in a signal copy protection apparatus in accordance with a second embodiment of this invention.

FIG. 12 is a block diagram of a correlator used in a signal copy protection apparatus in accordance with the second embodiment of this invention, in which numeral 907 denotes a multiplier, and numeral 908 denotes a modulation signal generator. What is different from the structure in FIG. 1 is that the bandpass filter 904 in the detector 9 is replaced by the correlator 906 in FIG. 12. Aside from this correlation, the structure is identical with that shown in FIG. 1 and FIG. 2, and the explanation is omitted, and only the operation of the correlator is described below.

A signal which is the same as the modulation signal used in the amplitude modulator 8 is generated by the modulation signal generator 908, and it is combined with the input signal in the multiplier 907, and the product is sent to the amplitude detector 905. The construction of the multiplier 907 is shown in FIG. 4. The structure of the modulation signal generator 908 is same as that of the noise generating means in FIG. 19. In the case of the second embodiment, needless to say, the part expressed by numeral 908 is used as the modulation signal generator in the amplitude modulator 8. Among the input signals of the correlator 906, if there is a component which is the same as the modulation signal and their phases are matched, the output of the multiplier 907 becomes a high level. Therefore, in the correlator 906, the phase of the output signal of the modulation signal generator 908 is shifted during every specified time period to check for the presence or absence of correlation.

When the output signal level of the correlator 906 is kept at a specified level for a specified time, needless to say, the amplitude detector 905 delivers a detection signal or stops the action of the copy apparatus 6.

Thus, by installing a correlator instead of the bandpass filter, an arbitrary signal may be used as a modulation signal, and erroneous detection may be prevented more reliably.

In the first embodiment, the automatic gain adjuster 902 was placed after the low cut filter 901, but it may be also placed before it, or after the wave detector 903 or after the bandpass filter 904.

This invention is, therefore, intended to prohibit copying by detecting the presence or absence of an amplitude modulation signal by installing an amplitude modulator and its detector, and hence dropout of the original music signal does not occur, and the amplitude change may be kept below the human detectable limit by sufficiently reducing the degree of amplitude modulation, and erroneous detection may be prevented by properly selecting the amplitude signal.

Figure 13:
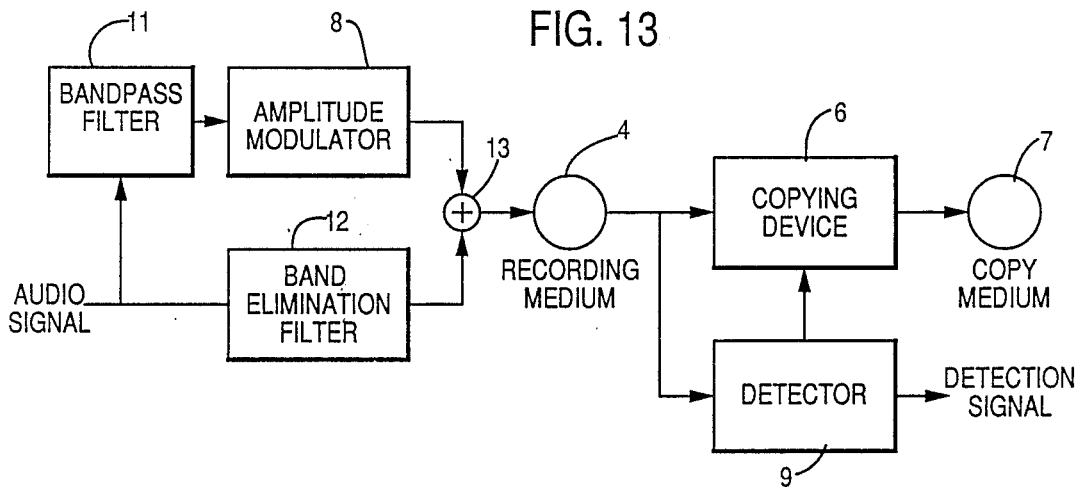
FIG. 13 is a structural drawing of a signal copy protection apparatus in a accordance with a third embodiment of this invention.

FIG. 13 shows the structure of a signal copy protection apparatus in accordance with a third embodiment of this invention, in which numerals 4, 6 to 9 denote elements which are identical with those in the first embodiment, of which details are shown in FIGS. 4 to 11. Numeral 11 denotes a bandpass filter, and numeral 12 denotes a band elimination filter; after the outputs of the two filters are added in an adder 13, the sum is input to a recording medium 4.

The operation of thus composed signal copy protection apparatus is described below while referring to FIGS. 13 to 17.

Figure 14:
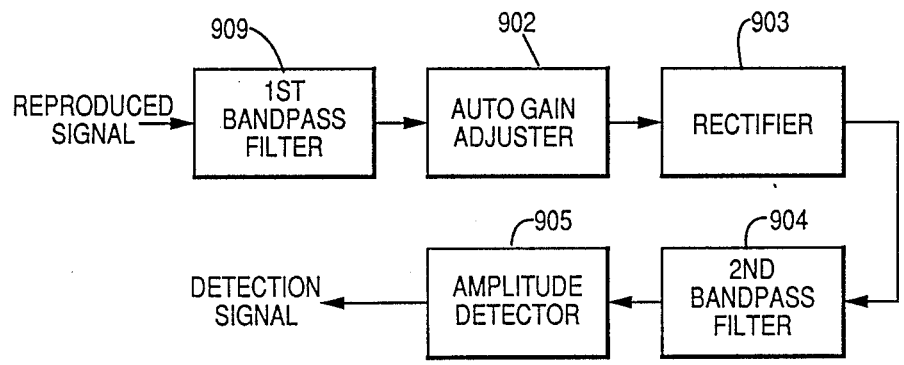
FIG. 14 is a detailed block diagram of the detector shown in FIG. 13.

FIG. 14 is a detailed block diagram of the detector 9 shown in FIG. 13, and the composition is the same as in the first embodiment except that numeral 909 denotes a first bandpass filter. The music signal in which copying is to be prohibited is combined with a signal outside a specified frequency band taken out by the band elimination filter 12 after taking out a specified frequency band, for example, only the components around 1 kHz as shown in FIG. 3 by means of the bandpass filter 11 and amplitude-modulating with a specified value by the amplitude modulator 8. As a result, a signal amplitude-modulated only in a specified frequency is obtained.

Figure 15:
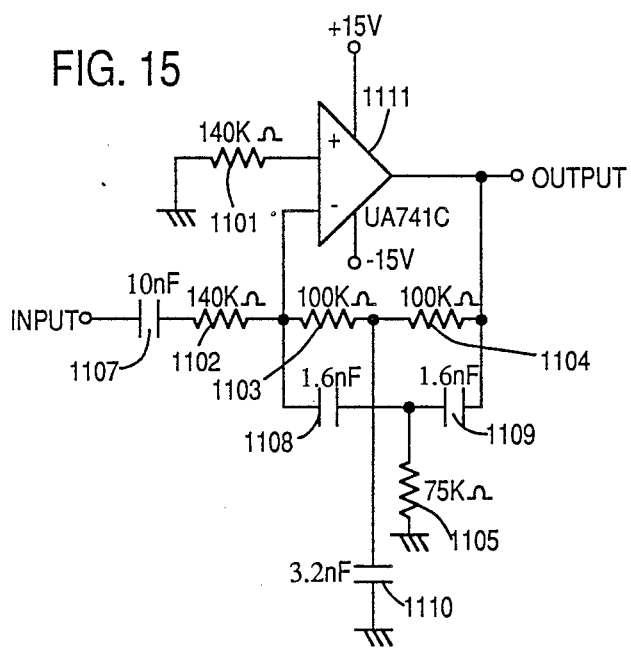
FIG. 15 is a structural drawing of a bandpass filter.

A detailed structure of the bandpass filter 11 is shown in FIG. 15, in which numerals 1101 to 1105 denote resistors; numerals 1107 to 1110 denote capacitors, and 1111 denotes an operational amplifier, these elements are combined to form a twin T bandpass filter as in the first embodiment shown in FIG. 9. However, the passband is 1 kHz.

Figure 16:
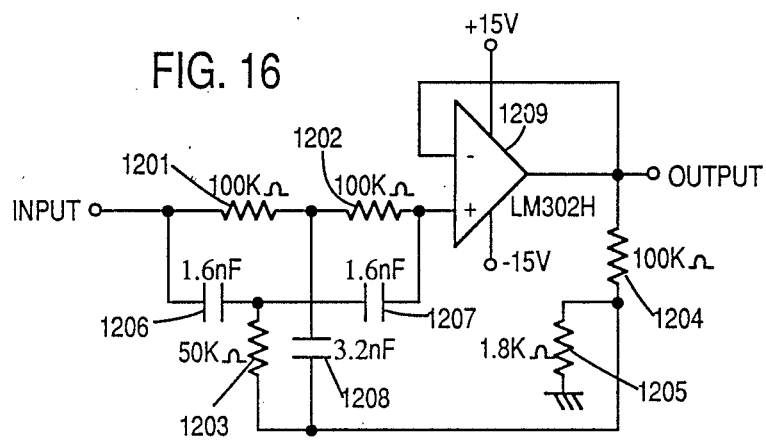
FIG. 16 is a structural drawing of a band elimination filter.

A detailed structure of the band elimination filter 12 is shown in FIG. 16, in which numerals 1201 to 1205 denote resistors; numerals 1206 to 1208 denote capacitors, and numeral 1209 denotes an operational amplifier; these elements are combined to form a twin T band elimination filter. The elimination band is also 1 kHz.

Figure 17:
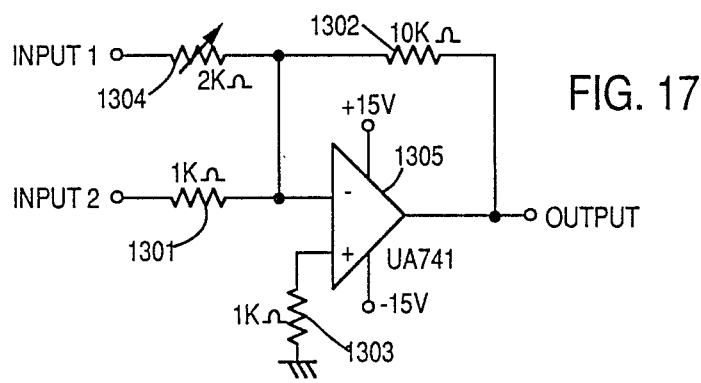
FIG. 17 is a structural drawing of an adder.

The structure of the adder 13 is shown in FIG. 17, in which numerals 1301 to 1303 denote resistors numeral 1304 denotes, a variable resistor, and numeral 1305 denotes an operational amplifier; an input signal 1 is input to the variable resistor 1304 and another input signal 2 is input to the resistor 1301, and the sum is delivered to the output terminal of the operational amplifier 1305. The addition level can be adjusted by adjusting the variable resistor 1304.

The modulation frequency is outside the human audible range, for example, 10 Hz, and the degree of modulation is similarly below the human detectable level, for example, 2%. By such modulation, a change in the sound quality cannot be sensed at all. When an attempt is made to duplicate from a recording medium or transmission medium such as a disc, tape and broadcast wave containing such a signal in a copy medium 7 such as tape by a copy apparatus 6 by reproducing such a music signal, the detector functions as follows.

From the music signal, the amplitude-modulated frequency component is taken out by the first bandpass filter 909, and is set at a specified amplitude by means of the automatic gain adjuster 902, so that the amplitude of the modulation signal is set constant for the ease of detection. The composition of the first bandpass filter is same as that shown in FIG. 15. The operation after the automatic gain adjuster 902 is same as in the first embodiment and is omitted here.

Thus, according to this embodiment, which comprises a bandpass filter for amplitude-modulating only a specific frequency component of input signal, a band elimination filter, an amplitude modulator, a recording medium for transmitting the output signal of said amplitude modulator, a detector for detecting the amplitude modulation signal by searching the output signal of said recording medium, and a copy apparatus for copying the output signal of said recording medium into a copy medium, since the prohibition of copying is specified by the presence or absence of amplitude modulation by delivering the detection signal or stopping the action of the copy apparatus when the detector detects that the output signal of the recording medium is amplitude-modulated to a specified value, dropout of the original music signal does not occur, and the change in amplitude may be kept under the human detectable limit by sufficiently reducing the degree of amplitude modulation, and also erroneous detection can be prevented by properly selecting the frequency of modulation signal and degree of modulation. Furthermore, by amplitude-modulating only the specific frequency component, deterioration of sound quality of the original music signal may be kept to a minimum.

In the third embodiment, incidentally, a single-frequency signal was used as modulation signal, but an arbitrary signal may be also used. In this case, instead of the bandpass filter as the means for detection of modulation signal, for example, a correlator as shown in FIG. 12 may be used for extracting the features of the modulation signal.

By installing a correlator instead of the bandpass filter, it is possible to use an arbitrary signal as a modulation signal, and erroneous detection may be prevented more reliably.

This invention is thus intended to specify prohibition of copying depending on the presence or absence of an amplitude modulation signal by installing an amplitude modulator and its detector, and therefore, degradation of the original music signal does not occur and the change in amplitude may be kept under the human detectable limit by sufficiently reducing the degree of amplitude modulation, and also erroneous detection may be prevented by properly selecting a modulation signal. Moreover, by amplitude-modulating only a specific frequency component, a deterioration of the sound quality of the original music signal may be kept to a minimum.

FIGS. 18(a)-(b) are block diagrams is a block diagram of a signal copy protection apparatus in accordance with a fourth embodiment of this invention, in which FIG. 18(a) illustrates a system for recording an audio signal on a recording medium element, 1 is an audio signal element 2 is an addition means, element 14 is a noise generating means; element 3 is a recording means for recording on a recording medium; element 4 is a recording medium FIG. 18(b) illustrates a system for reproducing and copying from the recording medium; element 5 is a reproducing means for reproducing signals from the recording medium; element 6 is a copy means; element 15 is a detection means, and element 7 is a copy medium.

The operation of thus composed signal copy protection apparatus is described below while referring to FIGS. 18 to 23.

First is described the step of manufacturing music software, that is, the step of recording an audio signal on a recording medium such as record, a CD, and music tape. The input audio signal is combined with a noise signal 141 by the addition means 2. The noise signal 141 is obtained from the noise generating means 14. The audio signal combined with the noise signal is recorded on the recording medium by the recording means 3.

Figure 19:
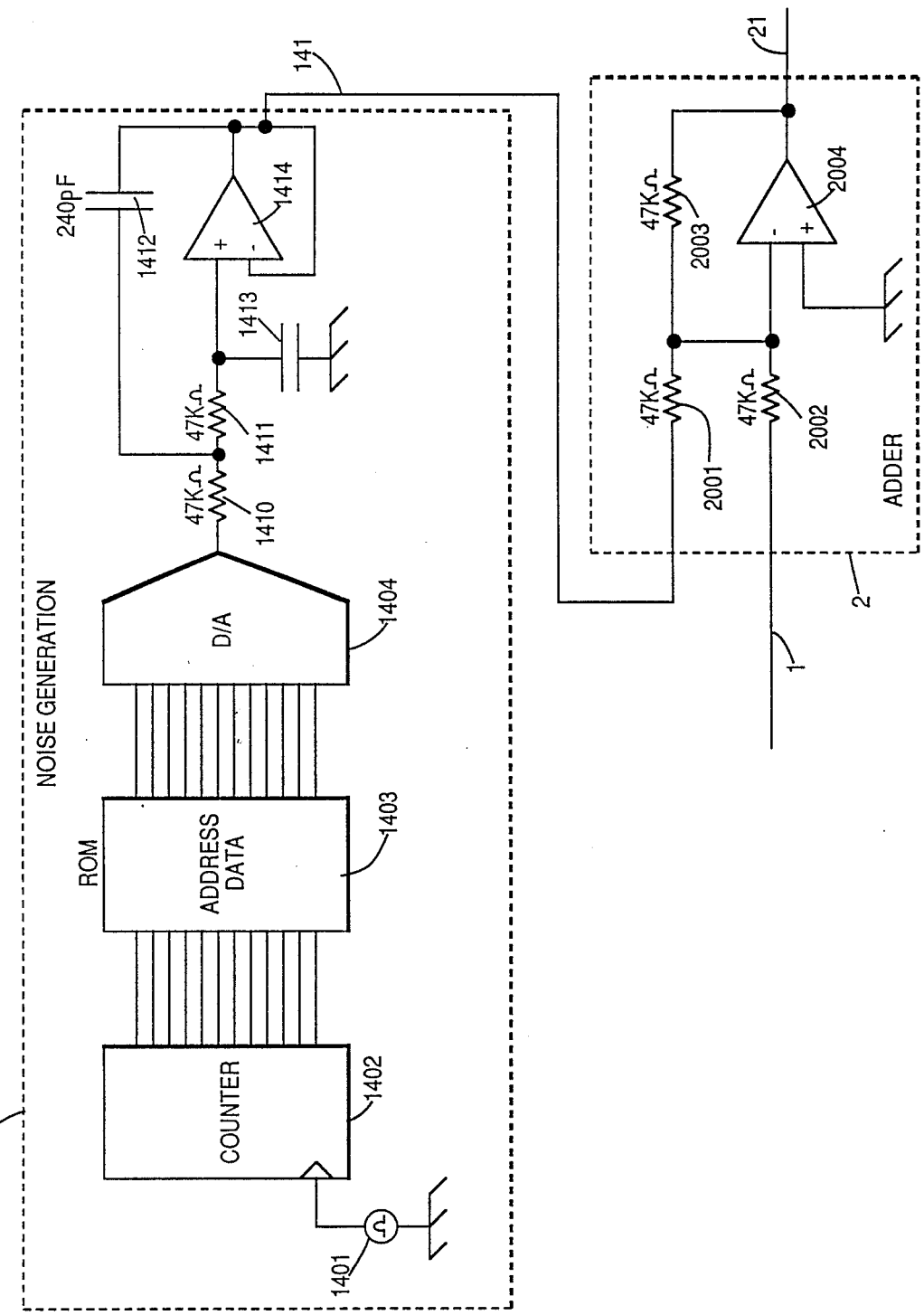
FIG. 19 is a circuit diagram of a noise generating means and addition means.
Figure 20:
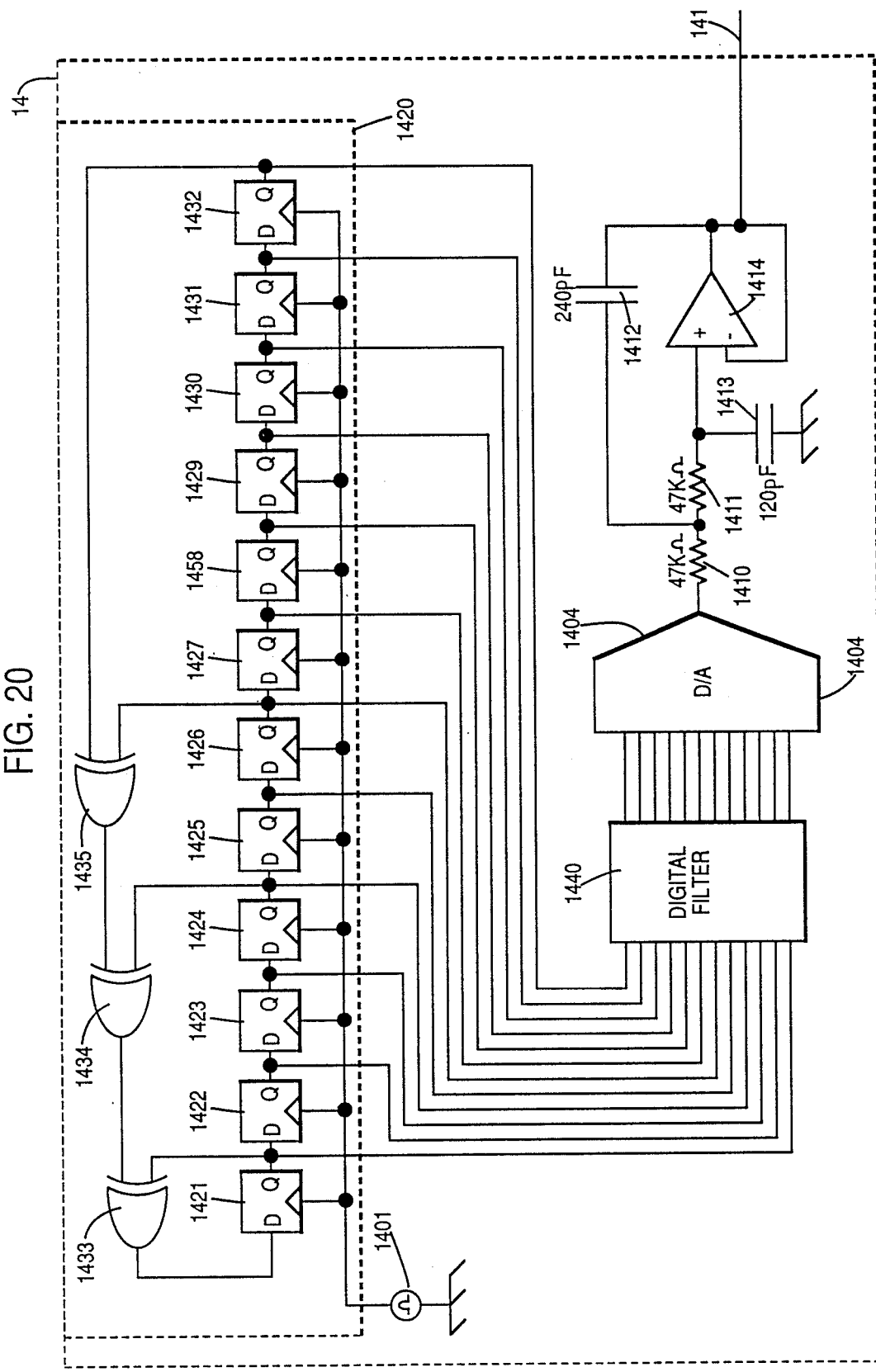
FIG. 20 is an equivalent circuit of a signal generating means.
Figure 21:
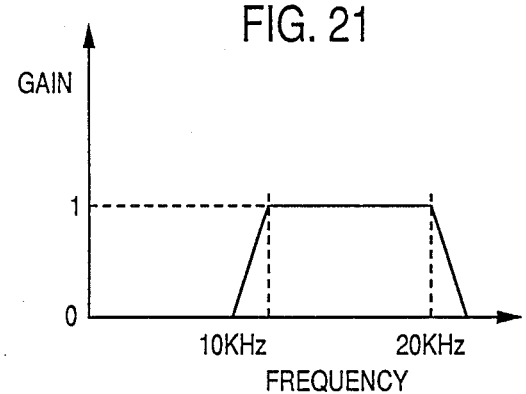
FIG. 21 shows the frequency characteristics of a digital filter.

FIG. 19 is a circuit diagram of noise generating means 14 and addition means 2, in which numeral 1401 denotes a clock signal generating circuit; element 1402 is a counter; element 1403 is a ROM, 1404 is a D/A converter; elements 1410 to 1411 are resistors; elements 1412 to 1413 are capacitors; elements 1414 is an operational amplifier; elements 2001 to 2003 are resistors, and element 2004 is an operational amplifier. The noise generating means 14 generates a noise signal by reading out the noise waveform stored in the ROM 1403. The capacity of the ROM 1403 is $2^{12}-1$ words, and the width of the output data is 12 bits. The counter 1402 works on the notation of $2^{12}-1$, and counts the clock pulses obtained from the clock generating circuit 1401, and generates an address of the ROM 1403. The clock frequency delivered by the clock generating circuit 1401 is 44.1 kHz, and this value becomes the sampling frequency of the noise waveform delivered by the ROM 1403. The noise waveform delivered from the ROM 1403 is converted into an analog signal by the 12-bit D/A converter 1404, and becomes a noise signal 141 after the repetitive component due to sampling is removed by the low pass filter composed a operational amplifier 1414. The low pass filter is of secondary Butterworth type, and the cutoff frequency is about 20 kHz. Since the noise signal is generated by repetitively reading out the noise waveform stored in the ROM, it is not perfectly random but is cyclic. The cycle of the noise signal is about 93 ms because the sampling frequency is 44.1 KHz and the counter 1402 is of notation of $2^{12}-1$. The characteristic of the noise signal is determined by the data stored in the ROM 1403. The equivalent circuit of the noise generating means 14 is shown in FIG. 20, in which numeral 1420 is an M-sequence generating circuit; 1421 to 1432 are D-type flip-flops, and 1433 to 1435 are Exclusive ORs. The signals simultaneously taken out from the outputs Q of 12 D-type flip-flops of the M-sequence generating circuit 1420 possess the characteristics similar to those of white noise. That is, the noise signal contains all frequency components. However, when such a noise signal is added to the audio signal, the noise is easily audible, and therefore, the noise signal is once passed through the digital filter 1440 to be limited to a band to which human ear has low sensitivity. The frequency characteristics of the digital filter 1440 are showing in FIG. 21. By passing the output signal of the M-sequence generating circuit through the digital filter 1440, the frequency components of the noise signal are limited to be between 10 kHz 20 kHz. The input signal of the digital filter 1440 is a repetitive pattern of $2^{12}-1$ pieces of data, and therefore, the output signal is also a repetitive pattern of $2^{12}-1$ pieces of data. By storing the output pattern of the digital filter 1440 in the ROM and reading it out, the circuit of the noise generating means 14 may be greatly simplified. The ROM 1403 in FIG. 19 is designed according to this principle.

The addition means 2 is composed of operational amplifier 204, and the noise signal 141 and audio signal 1 are added, and a recording signal 21 is obtained.

The recording means 3 is, for example, if the recording medium is a record, related to the manufacturing process of recording, including from the cutting to the pressing of the record disc.

The step of reproducing and copying the recording medium is described below. The reproduction signal 51 reproduced from the recording medium 4 by the reproducing means 5 is fed into the copying means 6 and detecting means 15. When the detecting means 15 detects that the noise signal 141 is contained in the reproduction signal, the detection signal 151 is set to a high level. The copying means 6 duplicates the reproduction signal 51 into the copying medium 7. This action, however, is stopped when the detection signal 151 is a high level.

The reproducing means 6 is, for example, if the recording medium is a record, a record reproducing system composed of a record player and audio amplifier.

Figure 22:
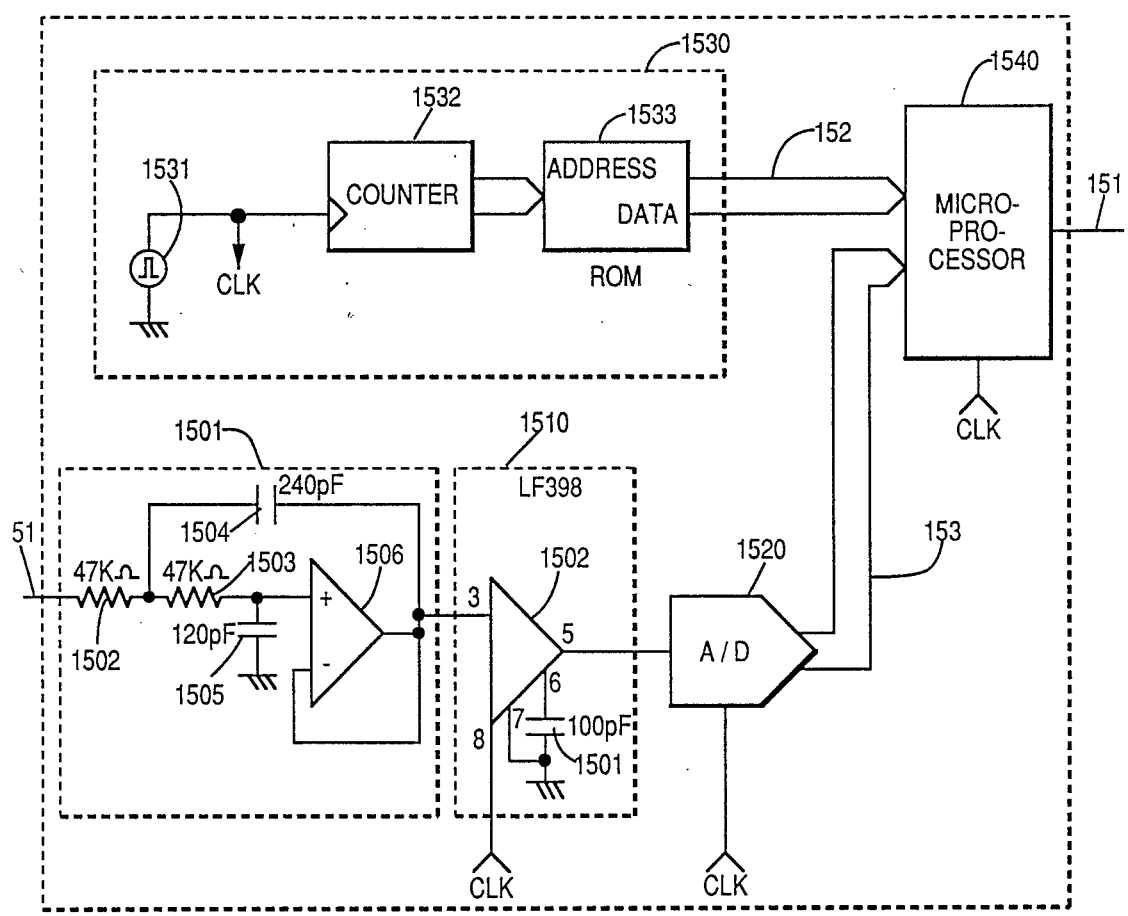
FIG. 22 is a circuit diagram of a detection means.

FIG. 22 is a circuit diagram of the detecting means 15, in which numeral 1501 is a lowpass filter; elements 1502 to 1503 are resistors; elements 1504 to 1505 are capacitors element 1506 is an operational amplifier element 1510 is a sample and hold circuit, element 1501 is a capacitor element 1502 is a sample and hold IC element 1520 is an A/D converter; element 1530 is a noise generating circuit; element 1531 is a clock generating circuit element 1532 is a counter element 1533 is a ROM element and and 1540 is a microprocessor.

The noise generating circuit 1530 is the noise generating means 14 minus the D/A converter and lowpass filter. The clock generating circuit 1531 generates a clock signal CLK of 44.1 kHz. The counter 1532 and ROM 1533 are respectively the same as the counter 1402 and ROM 1403. Therefore, the output data of the ROM 1402 and ROM 1533 are identical in pattern. The sampling frequency of the noise signal 152 which is the output of ROM 1533 is 44.1 kHz. The reproduction signal 51 fed into the detecting means 15 passes through the lowpass filter 1501 and sample and hold circuit 1510, and is quantized in the 16-bit A/D converter 1520. The sample pulse of the sample and hold circuit uses the clock signal CLK, and the sampling frequency of the sampled reproduction signal 153 is 44.1 kHz. The microprocessor 1540 determines the cross-correlation function of the noise signal 152 and the sampled reproduction signal 153. It the reproduction signal is f1(t) and the noise signal is f2(t) then the cross-correlation function $\phi(\tau)$ of f1(t) and f2(5) may be expressed by equation (1) below.

$$\phi(\tau) = \frac{1}{M} \sum_{k=0}^{M-1} f1(k) \cdot f2(k + \tau) \quad (1)$$

Figure 23:
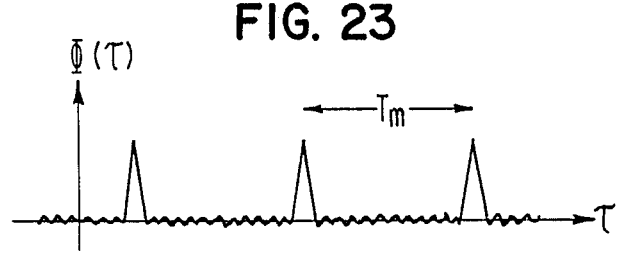
FIG. 23 is a diagram showing the cross-correlation function of a reproduced signal and a noise signal.

The microprocessor 1540 performs the calculation of equation (1). If the noise signal 141 is contained in the reproduction signal, the cross-correlation function has the peak in the cycle Tm as shown in FIG. 23. Tm is equal to the cycle of the noise signals 141 and 152. When the microprocessor 1540 detects the peak in FIG. 23 in the cross-correlation function, the detection signal 151 is set to a high level. This detection means 15 is contained in the same structure ad as the copying means 6.

The copying means 6 is, if the copying medium is a digital audio tape, a digital audio tape recorder. The detection signal 151 is fed into the microprocessor for control of the digital audio tape recorder, and when this signal becomes a high level, the recording action is stopped.

Thus, according to this embodiment, since the noise signal is added to the audio signal when recording the audio signal into on the recording medium and copying of the recording medium is prohibited when the noise signal is detected in the reproduction signal at the time of copying by reproducing this recording medium, the recording medium of which reproduction is prohibited is protected from being copied by the copy apparatus. Here, the noise signal added to the audio signal is not perfectly random, but is a cyclic waveform repeating the same pattern, and therefore, when the same noise signal is generated by the detecting means and the cross-correlation function between this noise signal and the reproduction signal is evaluated, the presence of noise signal in the reproduction signal can be detected. If the amplitude of the noise signal added to the audio signal is small, the noise does not matter when the recorded signal is reproduced. Besides, since the specific band of the audio signal is not attenuated, there is no effect on the sound quality.

Figure 24A:
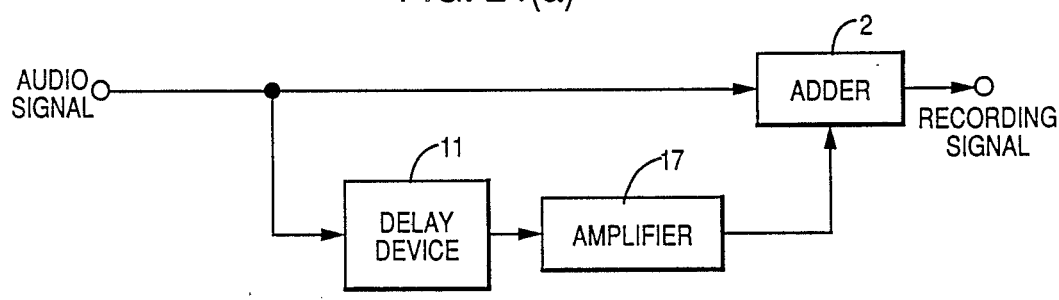
FIG. 24 (a) is a structural drawing of a copy code encoder in accordance width a fifth embodiment of this invention.
Figure 24B:
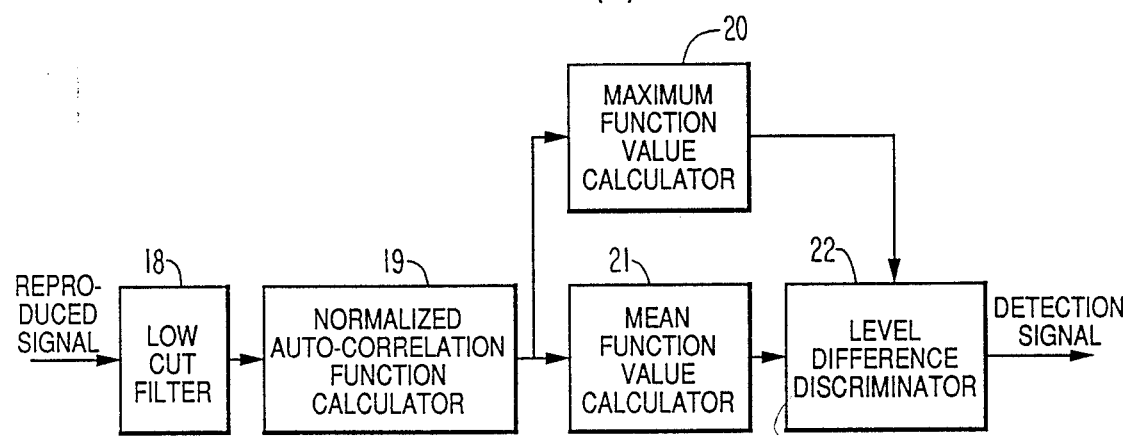

FIG. 24 (a) shows a block diagram of a copy code encoder in accordance with a signal copy protection apparatus in a fifth embodiment of this invention, in which numeral 16 is a delaying device; element 17 is an amplifier and element 2 is an adder. The audio signal is delayed by T seconds by the delaying device 16. This output is amplified K times by the amplifier 17, where K is a positive value smaller than 1. This output is combined with the audio signal in the adder 2 and thus the copy code is encoded. This output becomes a record signal.

FIG. 24 (b) shows a block diagram of a copy code detector in the signal copy protection apparatus in accordance with a fifth embodiment of this invention, in which numeral 18 is a low filter; element, 19 is a normalizing auto-correlation function calculator; element 20 is a maximum function calculator; element 21 is a mean function calculator, and element 22 is a level difference discriminator. The audio signal is passed through the low cut filter 18. This is intended to reduce the portion other than $\tau=0$ of the auto-correlation function $R(\tau)$ to be used in a later process. Next, the normalizing auto-correlation function $R(\tau)$ is calculated by the normalizing auto-correlation function calculator 19. This calculation method is described below. The output of the filter 18 is assumed to be A(t). An audio signal without a copy code is assumed to be a(t). The auto-correlation function of a(t) is assumed to be r($\tau$). Besides, t is assumed to be a discrete value. Hence, we obtain:

$$\therefore r(\tau) = \frac{1}{N} \sum_{t=0}^{N-\tau-1} a(t) \cdot a(t + \tau) \quad (2)$$

When N is a length of the interval of the auto-correlation.

$$R(\tau) = \frac{\frac{1}{N} \sum_{t=0}^{N-\tau-1} A(t) \cdot A(t + \tau)}{\frac{1}{N} \sum_{t=0}^{K-1} \{A(t)\}^2} \quad (3)$$

where $\tau$ is sufficiently smaller than N. If A(t)=a(t), then $$R(\tau) = \frac{r(\tau)}{r(0)} \equiv r_N(\tau) \quad (4)$$

This relationship is shown in FIG. 25, in which the ordinate axis denotes R(τ), and the abscissas axis represents The solid-line curve refers to r(τ).

If the audio signal contains the copy code, the operation is as follows.

At this time, we obtain $$A(t) = a(t) + k \cdot a(t-T) \tag{5}$$

If A(t) is ergodic, it follows that $$\frac{1}{N} \sum_{t=0}^{N-\tau-1} A(t) \cdot A(t + \tau) = (1 + k^2) \cdot r(\tau) + \tag{6}$$

$$k\{r(\tau + T) + r(\tau - T)\}$$

$$\therefore R(\tau) = \frac{r_N(\tau) + \frac{K}{1+K^2}\{r_N(\tau - T) + r_N(\tau + T)\}}{1 + \frac{2K}{1+K^2} \cdot r_N(T)} \tag{7}$$

$$K << 1, \; |r_N(\tau)| \leq 1, \text{ then}$$

$$R(\tau) \approx r_N(\tau) + K\{r_N(\tau - T) + r_N(\tau + T)\} \tag{8}$$

The second term of equation (8) is the effect of the copy code.

When τ = T or τ = −T, we obtain:

$$R(\tau) \approx r_N(T) + k \tag{9}$$

The effect due to the copy code is indicated by dotted line in FIG. 25. The relationships are $\Delta T_1 < \Delta T_3$, $\Delta T_2 < T_4$. These are smaller values than T.

Figure 26:
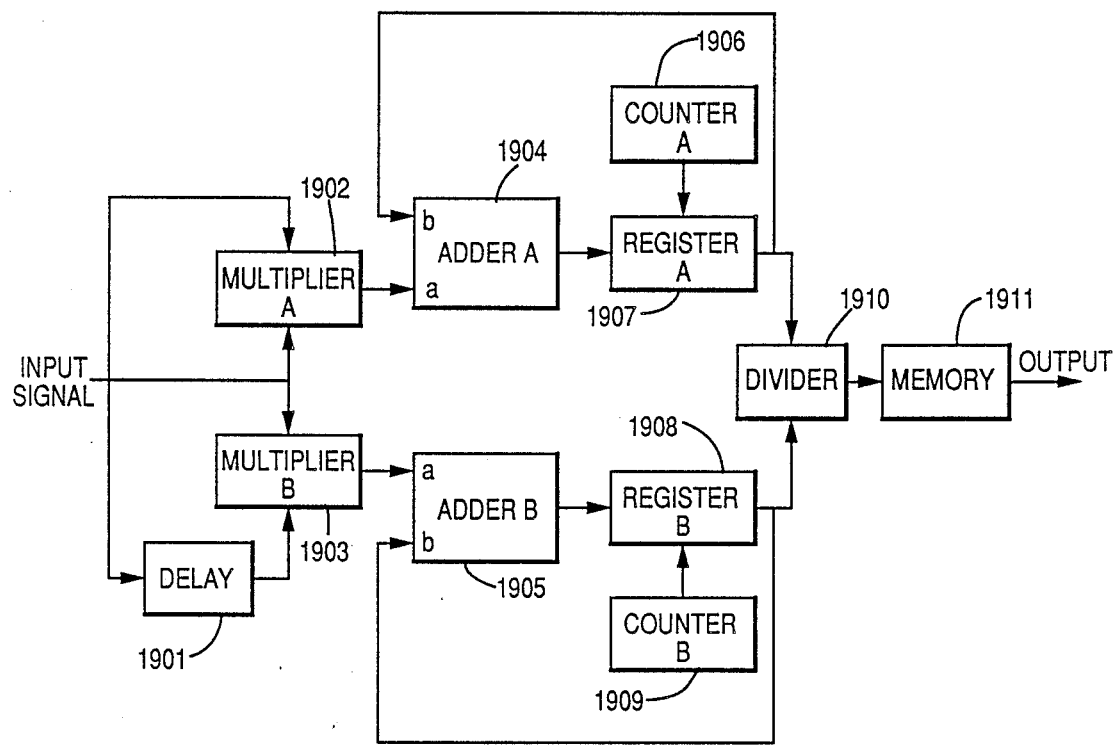
FIG. 26 is a structural example of a normalizing auto-correlation function calculator.

An example of construction of the normalizing auto-correlation function calculator 19 is shown in FIG. 26, in which numeral 1902 is a multiplier A; element 1903 is a multiplier B; element 1904 is an adder A; element 1095 is an adder B; element 1906 is a counter A; element 1907 is a register A; element 1908 is a register B; element 1909 is a counter B; element 1910 is a divider, and element 1911 is a memory. The delaying device 1901 has a delay time of τ. The input signal and its output, after passing through the delaying device 1901, are fed into the multiplier B 1903, and the product is obtained. Similarly, a square produce of the input signal is obtained in the multiplier A 1902. The output of the multiplier B 1903 is the a-input of the adder B 1905. This output is fed into the register B 1908. The register B 1908 is controlled by the counter B 1909. That is, the content of the register B is cleared in the first place. The counter B counts (N−τ) times, and it counts every time a sample comes to the register B to permit it to be stored in the register B. After counting (N−τ) times, the counting action is stopped, and the register B 1908 is not updated. The b-input of the adder B 1905 is the content of the register B 1908. In this way, the sum of the sample values of (N−τ) times of the outputs of the multiplier B 1903 is obtained at the output of the register B 1908. On the other hand, the output of the multiplier A 1902 is the a-input of the adder A 1904. This output is fed into the register A 1907. The register A is controlled by counter A 1906. That is, the content of the register A is cleared at the beginning. The counter A is to count N times, and counts every time a sample comes to the register to permit it to be stored in the register A. After counting N times, the counting action is stopped, and the register A 1907 is not updated. The b-input of the adder A 1904 is the content of the register A 1907. In this way, the sum of sample values of N times of the outputs of the multiplier A 1902 is obtained at the output of the register A 1907. In the divider 1910, the content of the register B is divided by the content of the register A. This result is stored in the memory 1911. Afterwards, the contents of the counter A, counter B, register A, and register B are cleared, and the value of τ is changed, and the same operation is repeated As the value of τ, meanwhile, any value between $T - \Delta T_3$ and $T + \Delta T_4$ is taken.

The maximum function calculator 20 calculates the maximum value of R(τ) in the relation of $T - \Delta T_1 \leq \tau \leq T + \Delta T_2$.

The mean function calculator 7 calculates the mean of R(τ) in the relations of $T - \Delta T_3 \leq \tau \leq T - \Delta T_1$ and $T + \Delta T_2 \leq \tau \leq T + \Delta T_4$.

The level difference discriminator 22 subtracts the output of the calculator 21 from the output of the calculator 20, and checks if the result is somewhere between $k - \Delta k_1$ and $k + \Delta k_2$, where $\Delta k_1$ and $\Delta k_2$ are smaller than k. If within this range, it is judged that the copy code is present, and otherwise it is judged that there is no copy code. This result is delivered.

According to this embodiment, as clear from the description hereabove, serious deterioration of the sound quality may be avoided by encoding by using a slight echo component as the copy code.

In FIG. 24 (a), meanwhile, one delaying device 16 and one amplifier 17 are used, but plural sets thereof may be installed in parallel. In this case, at the detector side, plural sets each consisting of a calculator 20 of a calculator 21 and a discriminator 22 must be used. But the principle is exactly the same as in this embodiment.

Alternatively an equivalent of a filter 18 may be placed in series with the delaying device 16 and amplifier 17. The sound quality may vary somewhat, but the detector output is not changed. As the filter 18, a bandpass filter or a highpass filter may be used.

Figure 27:
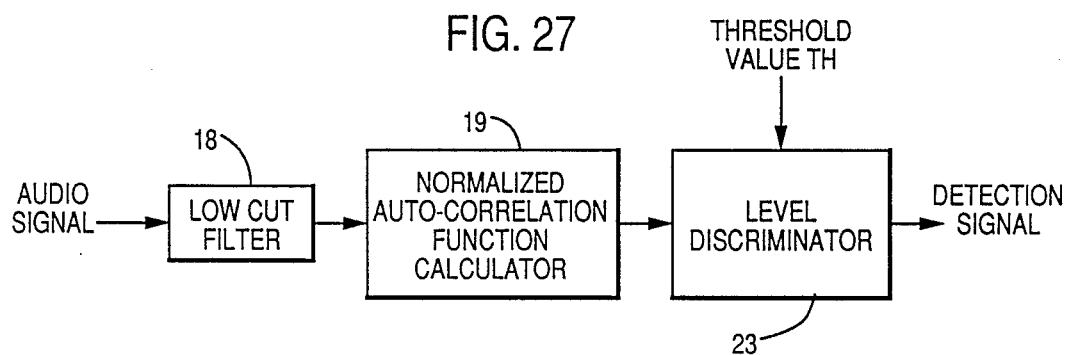
FIG. 27 is a structural drawing of a copy code detector in accordance with a sixth embodiment of this invention.

In this invention, therefore, a signal copy protection apparatus which causes only a small deterioration of the sound quality may be formed by by installing a delaying device, an amplifier and an adder as the copy code encoder, and by using a normalizing auto-correlation function calculator as the copy code detector FIG. 27 is a block diagram of a copy code detector of a signal copy protection apparatus in accordance with a sixth embodiment of this invention. What is different from the fifth embodiment is that a fixed threshold value th is used instead of installing the maximum function calculator. The effect of the copy code is indicated by broken line in FIG. 28. In an ordinary audio signal without a copy code, the threshold th is set at a level which cannot be reached by R(T). That is, $$R(T) = r_N(T) < th$$

However, if there is a copy code, in Order that R(T) may exceed th, the value of th is set in the relationship of $$th < R(T) \approx r_N(T) + K$$

Here, the construction of the normalizing auto-correlation function calculator 19 is as shown in FIG. 23. In the level discriminator 23, R(T) and threshold th are compared, and when R(T) is greater than th, an indication of the presence of the copy code is delivered, and when R(T) is smaller than th, an indication of the absence of a copy code is delivered.

In this embodiment, thus, by encoding by using a slight echo component as the copy code, the serious deterioration of the sound quality may be avoided.

This invention hence can compose a signal copy protection apparatus which causes only a small deterioration of the sound quality by installing a delaying device, an amplifier and an adder as the copy code encoder, and by using a normalizing auto-correlation function calculator as the copy code detector.

Figure 29:
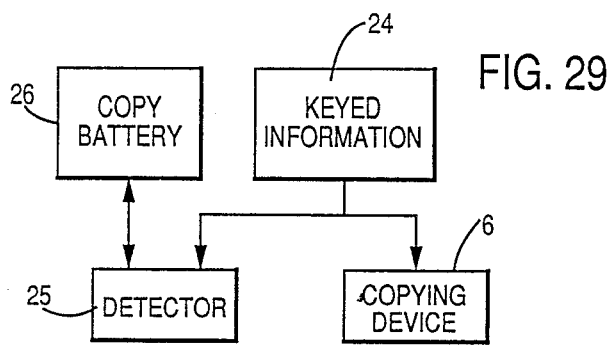
FIG. 29 is a structural drawing of signal copy protection method in accordance with a seventh embodiment of this invention.

A signal copy protection system in accordance with a seventh embodiment of this invention is described below while referring to the accompanying drawings. FIG. 29 shows the constitution of signal copy protection system in accordance with the seventh embodiment of this invention, in which numeral 24 is keyed information; element 25 is a detecting means; element 6 is a copying means, and element 26 is a copying battery, and the detecting means 25 controls the action of the copying means by the state of the copying battery 26.

Figure 30:
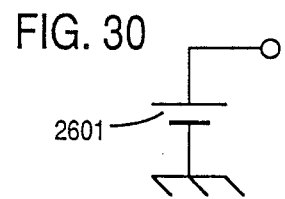
FIG. 30 is a first embodiment of a copy battery.

The operation of thus composed signal copy protection system is described below with reference to FIGS. 29 to 32. FIG. 30 is a detailed drawing of the copying battery.

First, the information whose copyright must be protected is locked with a key by a certain method. To lock with a key, a special signal is added to the information as shown in the methods in the embodiments shown in FIGS. 1, 13, 18, 24. When an attempt is made to duplicate such keyed information on a copying medium such as a tape by the copying means through the recording medium or transmission medium such as a disc, a tape or a broadcast wave, the detecting means 25 operates as follows.

At the beginning, when the detecting means 25 detects that the input information 24 is locked with a key, a check is made to see if the copying battery 26 is connected, and only when the electric power is supplied from both the copying battery 26 and the power source, is the operation of the copying means 6 enabled, and an electric power proportional to the copied information is subtracted from said copying battery.

Figure 31:
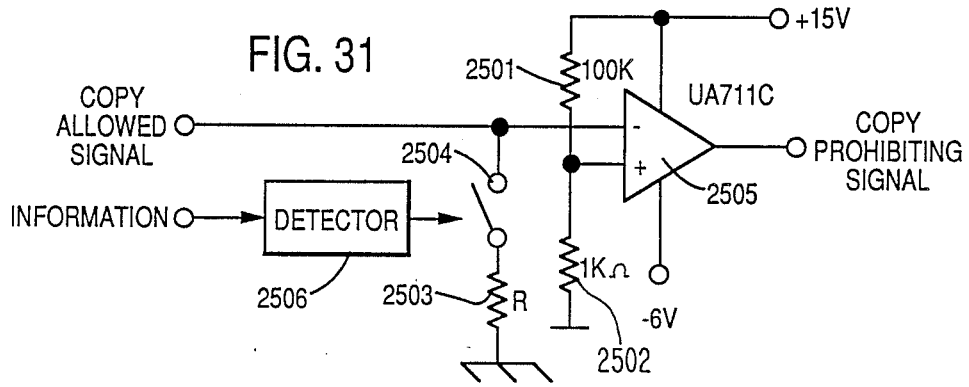
FIG. 31 is a first embodiment of a detection means.

FIG. 31 shows a detailed structure of the detecting means, in which numerals 2501 to 2503 are resistors element 2504 is a switch element 2505 is a level comparator, and element 2506 is a detector. The composition of the detector 2506 is the same as that shown in the embodiments shown in FIGS. 2, 14, 22, 24 and 27.

The locking of the information with a key is detected by the detector 2506, and the high level detection signal closes the switch 2504 connected to the copying battery 2601. As a result, the electric power of the battery 2601 is consumed through the resistor 2503, and while its voltage is higher than the value set by the resistors 2501 and 2502, the output signal of the level comparator 2505 maintains a low level, and the switch 601 in the copying means 6 of which detail is shown in FIG. 11 is closed, and the information is sent into the copying device 602.

Since the copying battery 2601 is a cell reserving a limited electric power, when its electric power is used up, the power can be no longer supplied, and the copy is interrupted.

Furthermore, the copying battery may be a virtual cell which stores the initial electric power quantity proportional to the copyright fee paid at the time of its purchase in the form of information.

Figure 32:
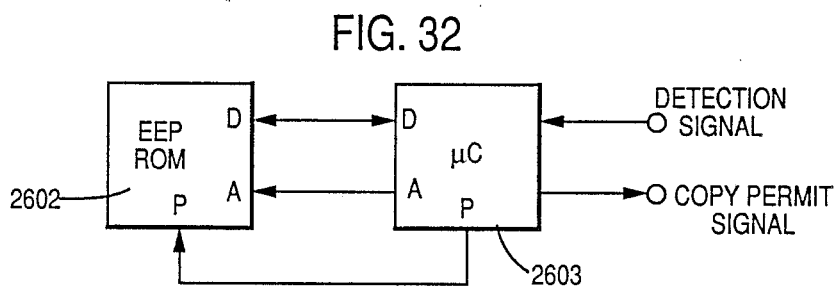
FIG. 32 is a second embodiment of a copy battery.

A detailed structure of a virtual cell is shown in FIG. 32, in which numeral 2602 is a read only memory which can be written electrically (EEPROM), and element 2603 is a microcomputer.

In this case, too, the copying means 6 does not operate unless it is used. When the virtual cell is used, the microcomputer 2603 supplies a copy permit signal as an electric power, and the copied information quantity is calculated from the time of the duration of the high level of detection signal, and the balance of quantity of electric power from which its proportional value is subtracted is stored again in the EEPROM 2602. When the stored value becomes zero, the microcomputer 2603 stops the supply of electric power. That is, the output of the copy permit signal is stopped. Therefore, the detecting means 25 stops the action of the copying means 6.

Thus, according to the seventh embodiment of this invention, which comprises the keyed information, the detecting means for detecting locking of information with a key, the copying battery for reserving a limited electric power, and the copying means for copying the information, in a manner to control the copying means by the detector depending on the battery state, even the keyed information can be copied only if the copying battery is available, so that the wide use of the useful information in the society is encouraged, while the copyright owner and the user can both enjoy its merits. Besides, if the unkeyed information is misunderstood as keyed information due to a malfunction, only the electric power reserved in the copying battery is consumed, and that information is not prohibited from being copied.

In the seventh embodiment, meanwhile, the copying battery is assumed to be a virtual cell reserving the initial electric power proportional to the copyright fee paid at the time of purchase in the form of information, but this is not limitative, and it may be composed of a finite number of unerasable memories as described below. In this case, instead of the electrically writable memory 2602 shown in FIG. 32, an unerasable memory (fuse ROM) is used, and when the microcomputer 2603 in the virtual cell 26 write a specified value into the memory 2602 by the number of times proportional to the quantity of copied information and detects that specified value is written in all memory regions, a low level copy permit signal is sent into the detecting means 25. The detecting means 25 receiving it sends a high level copy prohibition signal to the copying means 6, and the copying means 6 stop the copying action.

Figure 33:
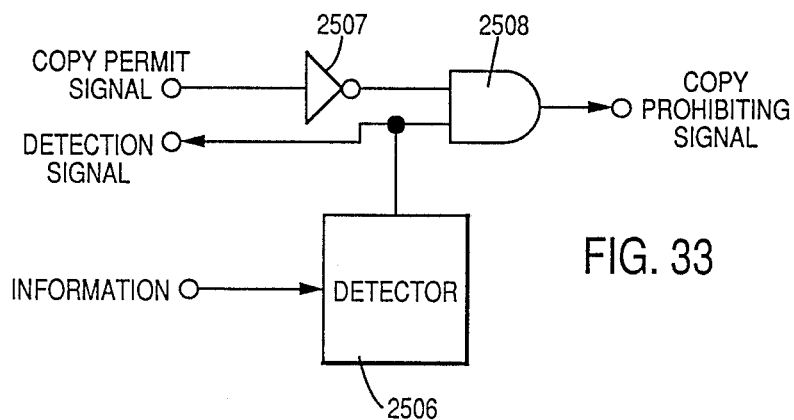
FIG. 33 is a second embodiment of a detection means.

FIG. 33 shows a detailed structure of a detecting means in accordance with an eighth embodiment of this invention, in which numeral 2506 is a detector as shown in the embodiments of FIGS. 2, 14, 19, 24, and 27 element 2507 is an inverter, and element 2508 is an AND circuit. When the key is detected by the detector 2506, the detector 2506 feeds a high level detection signal to the AND circuit 2508 and the microcomputer 2603 in the copying battery 26. As long as a high level copy permit signal is supplied from the microcomputer 2603 into the inverter 2507, the output of the inverter 2507 is at a low level, and therefore, the output of the AND circuit 2508 supplies the low level copy prohibition signal into the switch 601 in the copying means 6, so that copying is effected.

When the copy permit signal becomes a low level, the output of the inverter 2507 becomes a high level, and as long as the detector 2506 detects the key and is delivering the high level detection signal, the output of the AND 2508, that is, the copy prohibition signal is a high level, and the copying means 6 stops copying.

Furthermore, the copying battery may be a terminal machine of a bank online system, and the amount proportional to the quantity of copied information may be automatically subtracted from the account of the user to pay to the copyright owner.

In this case, the microcomputer 2603 shown in FIG. 32 is the online terminal, and the memory 2602 is the host computer in which the account is registered, and the above operation is effected.

Accordingly, in this invention, comprising the keyed information, the detecting means for detecting the locking of the information with the key, the copying battery for reserving a limited electric power, and the copying means for copying said information, when the detecting means detects that the input information in the copying means is locked with the key, the action of the copying means is enabled only if the electric power is supplied from both the copying battery and the power source, and the electric power proportional to the quantity of copied information is subtracted from the copying battery, which allows one to duplicate the information if locked with key as long as the copying battery is available, so that the wide use of useful information in the society is encouraged, while the copyright owner and the user both enjoy its merits. Even when unkeyed information is misjudged to be keyed information by an erroneous action, only the electric power reserved in the copying battery is consumed, but the information is not prohibited from being copied.

We claim:

1. An apparatus for detecting copy protection information from a reproduced signal from a recording medium which has recorded therein a signal which is to be protected from being copied and added to an echo signal thereof as the copy protection information, said apparatus comprising:
   a low cut filter for removing a low frequency component from the reproduced signal;
   a normalizing auto-correlation function calculator for calculating an auto-correlation function from an output signal of the low cut filter;
   a maximum function calculator for calculating a maximum value of the auto-correlation function in a specified time period from an output of the normalizing auto-correlation function calculator;
   a mean function calculator for calculating a mean value of the auto-correlation function in a specified time period from the output of the normalizing auto-correlation function calculator; and
   a level difference discriminator for determining if a difference between said maximum value and said mean value is within a specific range, and for indicating that the copy protection information is present in the reproduced signal when said difference is within said specific range.

2. An apparatus for detecting copy protection information from a reproduced signal from a recording medium which has recorded therein a signal which is to be protected from being copied and added with an echo signal thereof as the copy protection information, said apparatus comprising:
   a low cut filter for removing a low frequency component from the reproduced signal;
   a normalizing auto-correlation function calculator for calculating a self-correlation function from an output signal of said low cut filter; and
   a level discriminator for comparing a level of the auto-correlation function with a specific threshold level, and for determining that the copy protection information is present in the reproduced signal when the level of the auto-correlation function is higher than the threshold level.

3. An apparatus for copying copy-protected information having copy protected information showing that the copy-protected information is protected from being copied illegally, comprising:
   a storage means having stored therein a limited quantity of information;
   a detecting means for detecting the copy protection information from the copy-protected information and for detecting whether any information is stored in said storage means, wherein said detecting means, upon detection of the copy protection information, outputs a copy allowed signal when some information is stored in said storage means and a copy prohibiting signal in the absence of information being stored in said storage means; and
   a copying means responsive to said copy allowed signal for copying the copy-protected information while removing from said storage means a quantity of stored information proportional to a quantity of copied information, and responsive to said copy prohibiting signal for stopping the copying operation.

4. An apparatus as defined in claim 3, wherein said storage means comprises a battery having initially reserved therein a limited quantity of electric power.

5. An apparatus as defined in claim 3, wherein said storage means comprises a prepaid memory cell having initially stored therein a quantity of information corresponding to a copyright fee paid for purchasing said memory cell.

* * * * *